US011109303B2

(12) United States Patent
Zhang et al.

(10) Patent No.: US 11,109,303 B2
(45) Date of Patent: Aug. 31, 2021

(54) SYSTEM INFORMATION BROADCASTING METHOD AND APPARATUS, AND SYSTEM INFORMATION RECEIVING METHOD AND APPARATUS

(71) Applicant: Huawei Technologies Co., Ltd., Shenzhen (CN)

(72) Inventors: Hongping Zhang, Shanghai (CN); Mingzeng Dai, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 266 days.

(21) Appl. No.: 16/277,336

(22) Filed: Feb. 15, 2019

(65) Prior Publication Data
US 2019/0182754 A1 Jun. 13, 2019

Related U.S. Application Data

(63) Continuation of application No. PCT/CN2017/097668, filed on Aug. 16, 2017.

(30) Foreign Application Priority Data

Aug. 17, 2016 (CN) .......................... 201610681489.2

(51) Int. Cl.
*H04W 48/12* (2009.01)
*H04W 48/18* (2009.01)
(Continued)

(52) U.S. Cl.
CPC ........... *H04W 48/10* (2013.01); *H04W 48/20* (2013.01); *H04W 72/005* (2013.01); *H04W 74/0833* (2013.01); *H04W 48/12* (2013.01)

(58) Field of Classification Search
CPC ... H04W 48/10; H04W 48/20; H04W 72/005; H04W 74/0833; H04W 72/044; H04W 74/0841
See application file for complete search history.

(56) References Cited

U.S. PATENT DOCUMENTS

2010/0240368 A1* 9/2010 Fox ...................... H04W 36/04
455/435.3
2011/0105158 A1 5/2011 Arora et al.
(Continued)

FOREIGN PATENT DOCUMENTS

| CN | 101686580 A | 3/2010 |
|---|---|---|
| CN | 102474776 A | 5/2012 |

(Continued)

OTHER PUBLICATIONS

CATT, "System information in NR," R2-163470, Agenda: 9.4.3.2.3; 3GPP TSG RAN WG2 Meeting #94, Nanjing, China, May 23-27, 2016, 3 pages.

*Primary Examiner* — Diane L Lo
*Assistant Examiner* — Abusayeed M Haque
(74) *Attorney, Agent, or Firm* — Slater Matsil, LLP

(57) ABSTRACT

A system information broadcasting method and apparatus, and a system information receiving method and apparatus are provided. The system information broadcasting method includes: determining, by a first network device, first system information of a first cell, where there is no broadcast channel in the first cell and no system information is broadcast; and broadcasting, by the first network device, the first system information in a second cell of the first network device

19 Claims, 4 Drawing Sheets

(51) Int. Cl.
*H04W 72/04* (2009.01)
*H04W 48/10* (2009.01)
*H04W 48/20* (2009.01)
*H04W 72/00* (2009.01)
*H04W 74/08* (2009.01)

(56) References Cited

U.S. PATENT DOCUMENTS

| | | | |
|---|---|---|---|
| 2011/0128916 A1* | 6/2011 | Kwon | H04W 84/18 370/328 |
| 2011/0269500 A1 | 11/2011 | Johansson et al. | |
| 2013/0182583 A1* | 7/2013 | Siomina | H04W 24/00 370/252 |
| 2013/0215785 A1 | 8/2013 | Jung et al. | |
| 2014/0010204 A1 | 1/2014 | Xu et al. | |
| 2014/0112243 A1* | 4/2014 | Suzuki | H04W 76/28 370/328 |
| 2015/0018002 A1* | 1/2015 | Touag | H04W 72/0426 455/454 |
| 2015/0036645 A1 | 2/2015 | Shin et al. | |
| 2015/0072685 A1* | 3/2015 | Chuang | H04W 48/18 455/436 |
| 2015/0334637 A1* | 11/2015 | Kim | H04W 52/365 370/312 |
| 2016/0212665 A1* | 7/2016 | Fukuta | H04W 76/14 |
| 2016/0234826 A1* | 8/2016 | Chen | H04L 5/0091 |
| 2016/0366687 A1* | 12/2016 | Guo | H04L 5/0053 |
| 2017/0034751 A1* | 2/2017 | Fujishiro | H04W 36/00837 |
| 2017/0034753 A1* | 2/2017 | Yang | H04W 36/0085 |
| 2017/0118761 A1* | 4/2017 | Deshpande | H04L 5/0098 |

FOREIGN PATENT DOCUMENTS

| | | |
|---|---|---|
| CN | 102687543 A | 9/2012 |
| EP | 2323426 A1 | 5/2011 |
| EP | 2378812 A2 | 10/2011 |
| EP | 2523516 A1 | 11/2012 |
| EP | 2695404 B1 | 6/2017 |
| WO | 2016020000 A1 | 2/2016 |
| WO | 2018033099 A1 | 2/2018 |

* cited by examiner

SYSTEM INFORMATION BROADCASTING METHOD AND APPARATUS, AND SYSTEM INFORMATION RECEIVING METHOD AND APPARATUS

CROSS-REFERENCE TO RELATED APPLICATIONS

This application is a continuation of International Application No. PCT/CN2017/097668, filed on Aug. 16, 2017, which claims priority to Chinese Patent Application No. 201610681489.2, filed on Aug. 17, 2016. The disclosures of the aforementioned applications are hereby incorporated by reference in their entireties.

TECHNICAL FIELD

This application relates to the field of mobile communications technologies, and in particular, to a system information broadcasting method and apparatus and a system information receiving method and apparatus.

BACKGROUND

In a mobile communications system, each cell periodically broadcasts its system information. System information broadcast is an important function for a communications system and provides common information of the cell, thereby facilitating establishment of a wireless connection by a terminal. System information is a bond between a terminal and a network. A terminal completes various services and physical processes in wireless communication by obtaining system information broadcast by a cell.

Content of system information that is broadcast is divided into a plurality of system information blocks (SIB), among which one is usually used as a master information block (MIB). Therefore, system information includes one MIB and at least one SIB. SIBs are different in content and may be different in a broadcast period.

Because system information is broadcast periodically, a large quantity of system resources are occupied. Especially, in a future 5G system, some 5G cells use a high frequency, so that signal attenuation is high and cell coverage is small. To improve coverage, a beamforming technology may be used. The beamforming technology is very helpful for improving coverage, increasing edge throughput, suppressing interference, and the like. However, beams of beamforming are directional and can be targeted at only a relatively limited direction each time. To implement omnidirectional coverage required by system information broadcast, sending needs to be performed for a plurality of times. Consequently, system resource consumption is higher. Therefore, there is a desire find an effective solution to the above problem of the system information broadcast.

SUMMARY

Embodiments of this application provide a system information broadcasting method and apparatus and a system information receiving method and apparatus to reduce system resources occupied for broadcasting system information.

According to a first aspect, an embodiment of this application provides a system information broadcasting method. The method includes determining, by a first network device, first system information of a first cell. There is no broadcast channel in the first cell and no system information is broadcast. The method further includes broadcasting, by the first network device, the first system information in a second cell of the first network device.

According to the method provided in this embodiment of this application, after determining the first system information of the first cell, the first network device broadcasts the first system information in the second cell of the first network device. In this way, system information of a cell other than the second cell can be broadcast in the second cell, thereby reducing system resources occupied for broadcasting system information in the first cell and improving resource utilization of the first cell.

Optionally, the method further includes broadcasting, by the first network device in the second cell, second system information of the second cell.

By using the foregoing method, a terminal can obtain the second system information of the second cell from the second cell, so that when performing accessing, the terminal may select, based on at least one system information, an optimal cell to access.

Optionally, the first cell and the second cell belong to different network devices, and the network device to which the first cell belongs is a second network device. After the determining, by a first network device, first system information of a first cell, the method further includes receiving, by the first network device, a system information change request message sent by the second network device, where the system information change request message includes changed first system information; and determining, by the first network device, an effective time point of the changed first system information, and sending the effective time point to the second network device to instruct the second network device to use the changed first system information at the effective time point.

According to the foregoing method, after receiving the system information change request message sent by the second network device, the first network device sends the effective time point to the second network device, to instruct the second network device to use the changed first system information at the effective time point.

Optionally, after the sending the effective time point to the second network device, the method further includes broadcasting, by the first network device in the second cell, a system information change message, to inform a terminal receiving the system information change message that the first system information is changed.

Optionally, the first cell and the second cell belong to different network devices, and the network device to which the first cell belongs is a second network device. After the determining, by a first network device, first system information of a first cell, the method further includes: receiving, by the first network device, a system information change request message sent by the second network device, where the change request message includes an effective time point; and broadcasting, by the first network device in the second cell, a system information change message based on the effective time point, to inform a terminal receiving the system information change message that the first system information is changed.

Optionally, the first system information or the second system information includes any one or more of the following information: a downlink timing offset between the first cell and the second cell and a frequency list for broadcasting system information.

Optionally, a frequency used by the second cell is lower than a frequency used by the first cell, and the second cell performs broadcasting by using an omnidirectional antenna.

According to a second aspect, an embodiment of this application provides a system information broadcasting apparatus, including: a processing unit, configured to determine first system information of a first cell, where there is no broadcast channel in the first cell and no system information is broadcast. The system information broadcasting apparatus further includes a transceiver unit, configured to broadcast the first system information in a second cell of the first network device.

Optionally, the transceiver unit is further configured to broadcast second system information of the second cell in the second cell.

Optionally, the first cell and the second cell belong to different network devices, and the network device to which the first cell belongs is a second network device. The transceiver unit is further configured to receive a system information change request message sent by the second network device, where the system information change request message includes changed first system information; and determine an effective time point of the changed first system information, and send the effective time point to the second network device to instruct the second network device to use the changed first system information at the effective time point.

Optionally, the transceiver unit is further configured to broadcast a system information change message in the second cell, to inform a terminal receiving the system information change message that the first system information is changed.

Optionally, the first cell and the second cell belong to different network devices, and the network device to which the first cell belongs is a second network device. The transceiver unit is further configured to receive a system information change request message sent by the second network device, where the change request message includes an effective time point; and broadcast a system information change message in the second cell based on the effective time point, to inform a terminal receiving the system information change message that the first system information is changed.

Optionally, the first system information or the second system information includes any one or more of the following information a downlink timing offset between the first cell and the second cell; and a frequency list for broadcasting system information.

Optionally, a frequency used by the second cell is lower than a frequency used by the first cell, and the second cell performs broadcasting by using an omnidirectional antenna.

According to a third aspect, an embodiment of this application provides a system information broadcasting apparatus capable of implementing any system information broadcasting method provided in the first aspect.

In a possible design, a structure of the system information broadcasting apparatus includes a processor and a transceiver. The processor is configured to support the network slice configuration apparatus to implement a corresponding function in the foregoing system information broadcasting method. The transceiver is coupled to the processor and is configured to support communication between the system information broadcasting apparatus and a terminal, to send information or an instruction described in the system information broadcasting method to the terminal. The system information broadcasting apparatus may further include a memory. The memory is configured to store a program instruction and is coupled to the processor.

According to a fourth aspect, an embodiment of this application provides a system information receiving method. The method includes obtaining, by a terminal, first system information broadcast by a first network device in a second cell of the first network device. The first system information is system information of a first cell, and there is no broadcast channel in the first cell and no system information is broadcast. The method further includes camping on or accessing, by the terminal, the first cell based on the first system information.

According to the method provided in this embodiment of this application, by obtaining the first system information broadcast by the first network device in the second cell of the first network device, the terminal camps on or accesses the first cell. This increases a probability that the terminal accesses the first cell and improves system resource utilization.

Optionally, before the obtaining, by a terminal, first system information broadcast by a first network device in a second cell of the first network device. The method further includes obtaining, by the terminal, a frequency list for broadcasting system information; determining, by the terminal, that a frequency of the second cell exists in the frequency list for broadcasting system information and that the second cell satisfies a camping condition; and choosing, by the terminal, to camp on the second cell.

Optionally, after the camping on or accessing, by the terminal, the first cell based on the first system information. The method further includes listening to, by the terminal, a system information change message broadcast by the first network device in the second cell; and changing, by the terminal, the first system information based on the system information change message if finding the system information change message through listening.

Optionally, after the camping on, by the terminal, the first cell based on the first system information. The method further includes listening to, by the terminal, a paging message broadcast by the first network device in the second cell, where the paging message is used for paging the terminal; and accessing, by the terminal, the first cell if finding the paging message through listening.

Optionally, the first system information includes a downlink timing offset between the first cell and the second cell. Before the accessing, by the terminal, the first cell based on the first system information, the method further includes determining, by the terminal, a first system frame number SFN of the first cell based on a second SFN of the second cell and the downlink timing offset; or determining, by the terminal, the first SFN based on a second SFN of the second cell if determining that the first cell and the second cell are downlink synchronous; or determining, by the terminal, the first SFN based on a received random access message.

Optionally, the first system information includes any one or more of the following information a downlink timing offset between the first cell and the second cell or a frequency list for broadcasting system information.

Optionally, a frequency used by the second cell is lower than a frequency used by the first cell, and the second cell performs broadcasting by using an omnidirectional antenna.

Optionally, the first cell and the second cell belong to different network devices, and the network device to which the first cell belongs is a second network device.

According to a fifth aspect, an embodiment of this application provides a system information receiving apparatus, including a transceiver unit, configured to obtain first system information broadcast by a first network device in a second cell of the first network device, where the first system information is system information of a first cell. There is no broadcast channel in the first cell and no system information is broadcast. The system information receiving apparatus further includes a processing unit, configured to camp on or access the first cell based on the first system information.

Optionally, the transceiver unit is further configured to obtain a frequency list for broadcasting system information. The processing unit is further configured to determine that a frequency of the second cell exists in the frequency list for broadcasting system information and that the second cell satisfies a camping condition; and camp on the second cell.

Optionally, the transceiver unit is further configured to listen to a system information change message broadcast by the first network device in the second cell; and change the first system information based on the system information change message if finding the system information change message through listening.

Optionally, the transceiver unit is further configured to listen to a paging message broadcast by the first network device in the second cell, where the paging message is used for paging the terminal; and access the first cell if finding the paging message through listening.

Optionally, the first system information includes a downlink timing offset between the first cell and the second cell. The processing unit is further configured to determine a first system frame number SFN of the first cell based on a second SFN of the second cell and the downlink timing offset; or determine the first SFN based on a second SFN of the second cell if determining that the first cell and the second cell are downlink synchronous; or determine the first SFN based on a received random access message.

Optionally, the first system information includes any one or more of the following information: a downlink timing offset between the first cell and the second cell; and a frequency list for broadcasting system information.

Optionally, a frequency used by the second cell is lower than a frequency used by the first cell, and the second cell performs broadcasting by using an omnidirectional antenna.

Optionally, the first cell and the second cell belong to different network devices, and the network device to which the first cell belongs is a second network device.

According to a sixth aspect, an embodiment of this application provides a system information receiving apparatus capable of implementing any system information receiving method provided in the first aspect.

In a possible design, a structure of the system information receiving apparatus includes a processor and a transceiver. The processor is configured to support the network slice configuration apparatus to implement a corresponding function in the foregoing system information receiving method. The transceiver is coupled to the processor and is configured to support communication between the system information receiving apparatus and a terminal, to send information or an instruction described in the system information receiving method to the terminal. The system information receiving apparatus may further include a memory. The memory is configured to store a program instruction and is coupled to the processor.

According to a seventh aspect, an embodiment of this application provides a computer storage medium, configured to store a computer software instruction that is used by the system information broadcasting apparatus provided in the second aspect, and including a program designed to perform the first aspect.

According to an eighth aspect, an embodiment of this application provides a computer storage medium, configured to store a computer software instruction that is used by the system information receiving apparatus provided in the fourth aspect, and including a program designed to perform the third aspect.

DETAILED DESCRIPTION OF ILLUSTRATIVE EMBODIMENTS

Figure 1:
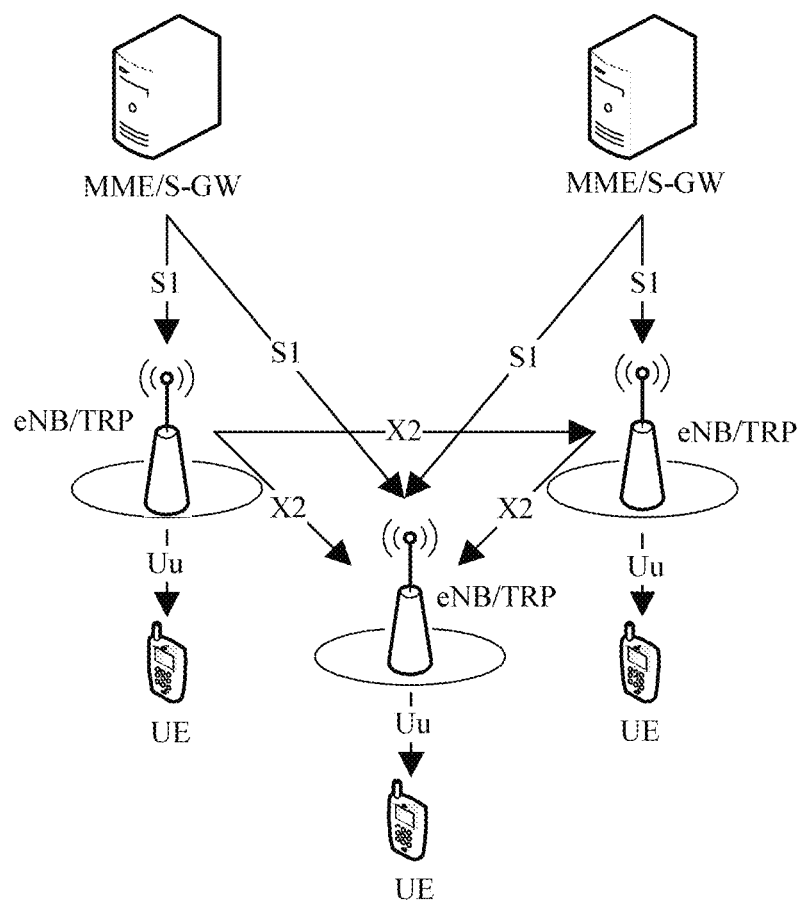
FIG. 1 is a schematic architectural diagram of an LTE system.

Embodiments of this application may be applied to a communications system such as an LTE (Long Term Evolution) system or a 5G system. FIG. 1 is a schematic architectural diagram of an LTE system. Network elements and interfaces in FIG. 1 are described below:

MME (Mobility Management Entity)/S-GW (Serving GateWay): The MME is a key control node in LTE and is a network element of a core network. The MME is mainly responsible for signaling processing, that is, a control plane function including access control, mobility management, attachment and detachment, session management, gateway selection, and the like. The S-GW is a network element of a core network in LTE and is mainly responsible for a user plane function of user data forwarding, that is, for routing and forwarding of a data packet under the control of the MME.

eNB (evolved Node B): The eNB is a base station in LTE and is mainly responsible for a function such as radio resource management, QoS (Quality of Service) management, or data compression and encryption on an air interface side. On a core network side, the eNB is mainly responsible for forwarding control plane signaling to an MME and forwarding user plane service data to an S-GW.

UE (User Equipment): The UE is a device accessing a network side through an eNB in LTE and may be, for example, a handheld terminal, a notebook computer, or another device that can access the network.

S1 interface: The S1 interface is a standard interface between an eNB and a core network. The eNB is connected to an MME through an S1-MME interface to control signaling transmission. The eNB is connected to an S-GW through an S1-U interface to control user data transmission.

The S1-MME interface and the S1-U interface are collectively referred to as the S1 interface.

X2 interface: The X2 interface is a standard interface between eNBs and is used for interworking between base stations.

Uu interface: The Uu interface is a radio interface between UE and a base station. UE accesses an LTE network through the Uu interface.

Figure 2:
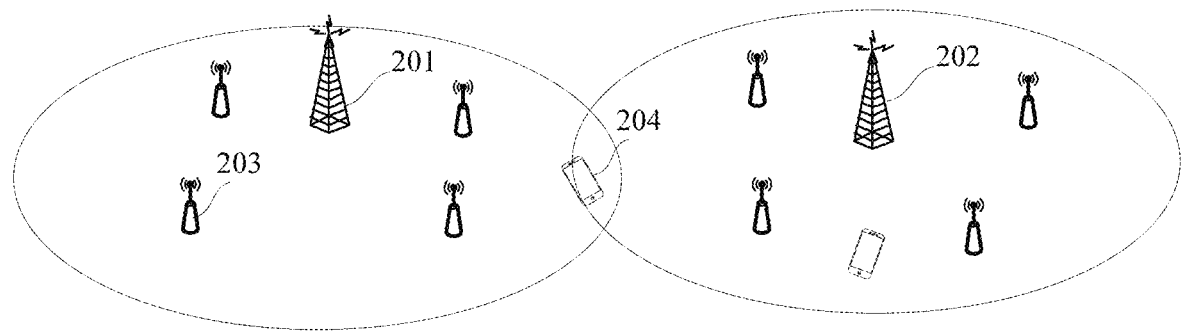
FIG. 2 is a schematic diagram of a communications network.

The solution in the embodiments of this application is further applicable to a scenario in which a terminal moves between different cells. Specifically, as shown in FIG. 2, when moving from an area covered by a base station 201 to an area covered by a base station 202, a terminal 204 determines information such as system information of a cell of the base station 202. The base station 201 and the base station 202 may further cover a plurality of micro base stations 203.

In the embodiments of this application, the term "terminal" includes but is not limited to a mobile station, a fixed or mobile subscriber unit, a pager, a cellular phone, a personal digital assistant (PDA), a computer or any other types of user equipments (UEs) capable of working in a wireless environment. The term "network device" includes but is not limited to a base station, a node, a base station controller, an access point (AP) or any other types of interface devices capable of working in a wireless environment.

Figure 3:
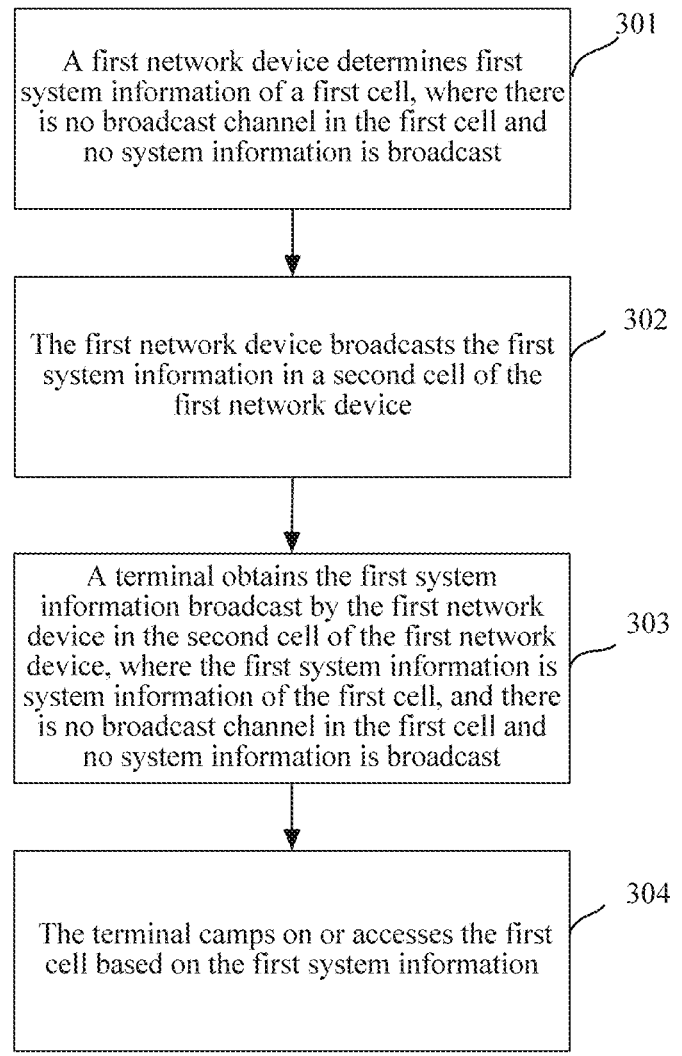
FIG. 3 is a schematic flowchart of a system information broadcasting method according to an embodiment of this application.

Based on the foregoing descriptions, FIG. 3 is a schematic flowchart of a system information broadcasting method according to an embodiment of this application.

Referring to FIG. 3, the method includes the following steps.

Step 301: A first network device determines first system information of a first cell.

In an implementation, there is no broadcast channel in the first cell and no system information is broadcast in the first cell.

Typically, the first cell uses a high frequency. The first cell generally communicates with a terminal by using a beamforming technology.

Step 302: The first network device broadcasts the first system information in a second cell of the first network device.

In this embodiment of this application, an area covered by the first cell overlaps an area covered by the second cell.

Step 303: A terminal obtains the first system information broadcast by the first network device in the second cell of the first network device, where the first system information is system information of the first cell, and there is no broadcast channel in the first cell and no system information is broadcast in the first cell.

Step 304: The terminal camps on or accesses the first cell based on the first system information.

In this embodiment of this application, the system information may be divided into an MIB and an SIB. For specific content included in the system information, refer to descriptions in a standard such as an LTE standard, and details are not described herein.

In step 301, when both the first cell and the second cell belong to the first network device, the first network device may directly determine the first system information of the first cell. For example, the first network device determines the system information of the first cell based on load of the first network device.

When the first cell and the second cell belong to different network devices, and the network device to which the first cell belongs is a second network device, the first network device may request the second network device for the first system information, or the second network device may actively report the first system information to the first network device. This is not limited in this embodiment of this application.

Optionally, in this embodiment of this application, the first system information may include any one or more of the following information: a downlink timing offset between the first cell and the second cell; and a frequency list for broadcasting system information, where the frequency list for broadcasting system information includes at least one frequency. The frequency in the frequency list for broadcasting system information is a frequency for broadcasting system information, and the terminal may determine the frequency for broadcasting system information directly based on the frequency list for broadcasting system information, so that system information is quickly determined.

Optionally, in this embodiment of this application, the first cell uses the beamforming technology, so that a directional beam is generated. In addition, because no system information broadcast channel is allocated to the first cell, no system information can be broadcast.

In step 302, when broadcasting the first system information, the first network device, may further broadcast second system information of the second cell in the second cell. By using the foregoing method, the terminal can obtain the second system information of the second cell from the second cell, so that when performing accessing, the terminal may select, based on at least one system information, an optimal cell to access.

Optionally, the second system information may include any one or more of the following information: a downlink timing offset between the first cell and the second cell; and a frequency list for broadcasting system information.

Optionally, in this embodiment of this application, a frequency used by the second cell is lower than a frequency used by the first cell, and the second cell broadcasts system information in the entire second cell by using an omnidirectional antenna. That is, the second cell does not broadcast system information by using the beamforming technology.

After it is determined that the first system information is changed, the first network device broadcasts the changed first system information in the second cell.

In a possible scenario, both the first cell and the second cell belong to the first network device. In this case, the first network device may directly determine the changed first system information and broadcast the changed first system information in the second cell.

In a possible scenario, the network device to which the first cell belongs is a second network device. In this case, the first network device receives a system information change request message sent by the second network device, where the system information change request message includes changed first system information. The system information change request message is sent after the second network device determines that the first system information needs to be changed.

The first network device determines an effective time point of the changed first system information after receiving the system information change request message, and sends the effective time point to the second network device to instruct the second network device to use the changed first system information at the effective time point. In addition, the first network device may broadcast a system information change message in the second cell, to inform a terminal receiving the system information change message that the first system information is changed.

In the scenario in which the network device to which the first cell belongs is the second network device, an effective time point may further be determined by the second network device. In this case, the first network device receives a system information change request message sent by the second network device, where the change request message includes an effective time point. Then, the first network device broadcasts a system information change message in the second cell based on the effective time point, to inform a terminal receiving the system information change message that the first system information is changed.

Optionally, the system information change message may include at least one of the following: the changed first system information; the effective time point; and a cell identifier of the first cell. The effective time point is used to indicate the effective time point of the changed first system information.

Certainly, the foregoing is merely an example, and the system information change message may further include other information, and details are not described herein.

Optionally, in this embodiment of this application, the system information change message may be a paging message.

It should be noted that, in this embodiment of this application, when broadcasting the first system information and the second system information in the second cell, the first network device may further broadcast system information of another cell. A quantity of system information broadcast by the first network device in the second cell is not limited in this embodiment of this application and may be determined based on an actual situation. Details are not described herein. Furthermore, the first system information may be broadcast by a network device other than the first network device. This is not limited in this embodiment of this application.

Optionally, in this embodiment of this application, considering that system information of a plurality of cells may be broadcast in the second cell, and content of the system information of the plurality of cells may be partially or completely the same, to reduce system resource overheads used for broadcast, the content of the system information may be divided into one or more system information subblocks, and each system information subblock has one or more sets of configurations. A set of configuration used by a system information subblock in a cell is indicated for the cell, or one or more cell identifiers used by each set of configuration is indicated for the configuration. Cells corresponding to the one or more cell identifiers use a same set of configuration, and each set of configuration is broadcast by the first network device in each period only once. This saves the system resources.

Before step 303, the terminal needs to first camp on the second cell.

In a possible implementation, the terminal first searches for all possible frequencies and determines a frequency for broadcasting system information from all the possible frequencies, and then selects a cell satisfying a camping condition from cells corresponding to the frequency for broadcasting system information. In this implementation, if determining that a found frequency of the second cell is for broadcasting system information and that the second cell satisfies the camping condition, the terminal chooses to camp on the second cell.

In a possible implementation, the terminal first obtains a frequency list for broadcasting system information, and then determines that a frequency of the second cell exists in the frequency list for broadcasting system information and that the second cell satisfies the camping condition, so that the terminal chooses to camp on the second cell.

It should be noted that, a manner in which the terminal obtains the frequency list for broadcasting system information is not limited in this embodiment of this application. The terminal may obtain the frequency list for broadcasting system information by using the first network device or may obtain the frequency list for broadcasting system information in another manner. Details are not described herein.

In step 303, after camping on the second cell, the terminal listens to, in the second cell, a message such as the first system information of the first cell broadcast by the first network device.

After obtaining the first system information of the first cell from the second cell, the terminal may perform cell reselection in step 304 to camp on or access the first cell. In this embodiment of this application, the terminal may obtain, through the cell reselection, a cell in which no system information is broadcast but system information of the cell is obtained by the terminal.

In step 304, after camping on or accessing the first cell, the terminal may further listen to a system information change message broadcast by the first network device in the second cell. The terminal changes the first system information based on the system information change message if finding the system information change message through listening. For content included in the system information change message, refer to the foregoing descriptions, and details are not described herein again.

Optionally, after camping on the first cell, the terminal may further listen to a paging message broadcast by the first network device in the second cell, where the paging message is used for paging the terminal. The terminal accesses the first cell if finding the paging message through listening.

It should be noted that, when listening to the paging message in the first cell, the terminal calculates a paging occasion of the paging message based on a parameter provided by the second cell.

After finding the paging message through listening, the terminal may access the first cell based on the first system information.

In a process of accessing the first cell, the terminal may need to determine an SFN (System Frame Number) of the first cell. In this embodiment of this application, the SFN of the first cell is referred to as a first SFN and an SFN of the second cell is referred to as a second SFN.

The terminal determines the first SFN in a plurality of manners. In a possible implementation, the terminal determines the first SFN based on the second SFN of the second cell if determining that the first cell and the second cell are downlink synchronous. Specifically, if determining that the first cell and the second cell are downlink synchronous, the terminal may determine that the first SFN is the same as the second SFN. In this case, the terminal may directly use the second SFN as the first SFN.

In a possible implementation, the first system information received by the terminal includes a downlink timing offset between the first cell and the second cell. In this case, the terminal may determine the first system frame number SFN of the first cell by using the second system frame number SFN of the second cell and the downlink timing offset. Specifically, the terminal determines a sum of the downlink timing offset and the second SFN as the first SFN.

In a possible implementation, the terminal may determine the first SFN based on a received random access message. The random access message may be a RAR (Random Access Response) message including the first SFN and sent by a network device corresponding to the first cell to the terminal when the terminal accesses the first cell.

Figure 4:
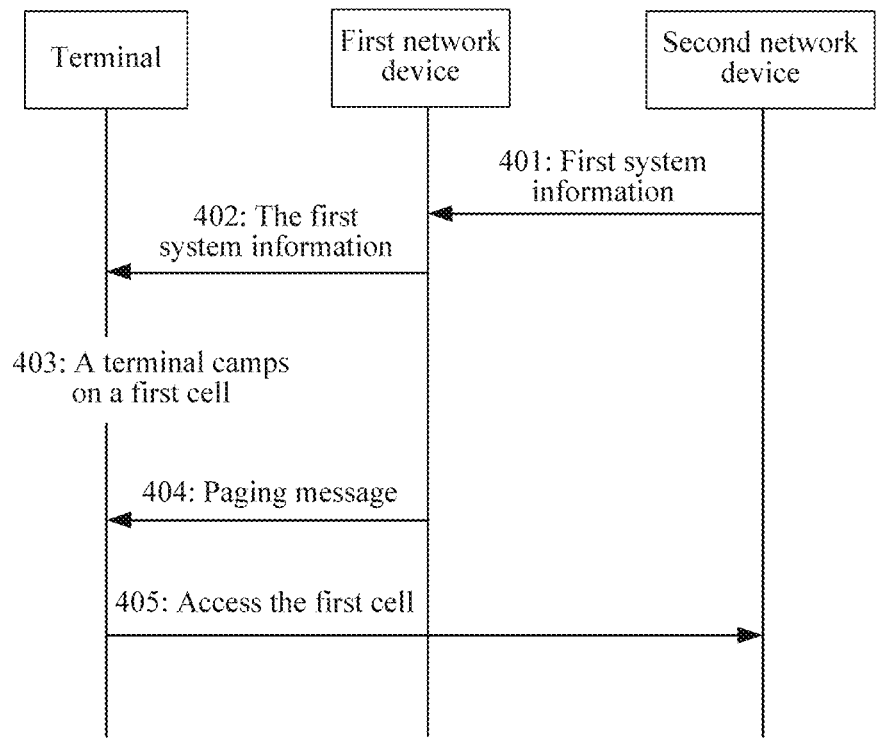
FIG. 4 is a schematic flowchart of a system information broadcasting method according to an embodiment of this application.

With reference to the foregoing descriptions, FIG. 4 is a schematic flowchart of a system information broadcasting method according to an embodiment of this application.

In FIG. 4, a first cell and a second cell belong to different network devices. For a scenario in which the first cell and the second cell belong to a same network device, refer to the descriptions of FIG. 4, and details are not described herein again.

Step 401: A second network device sends first system information of the first cell to a first network device.

Step 402: The first network device broadcasts the first system information in the second cell.

Step 403: A terminal camps on the first cell based on the first system information.

Step 404: The first network device broadcasts a paging message in the second cell, where the paging message is used for paging the terminal.

Step 405: The terminal accesses the first cell after finding the paging message in the first cell through listening.

Figure 5:
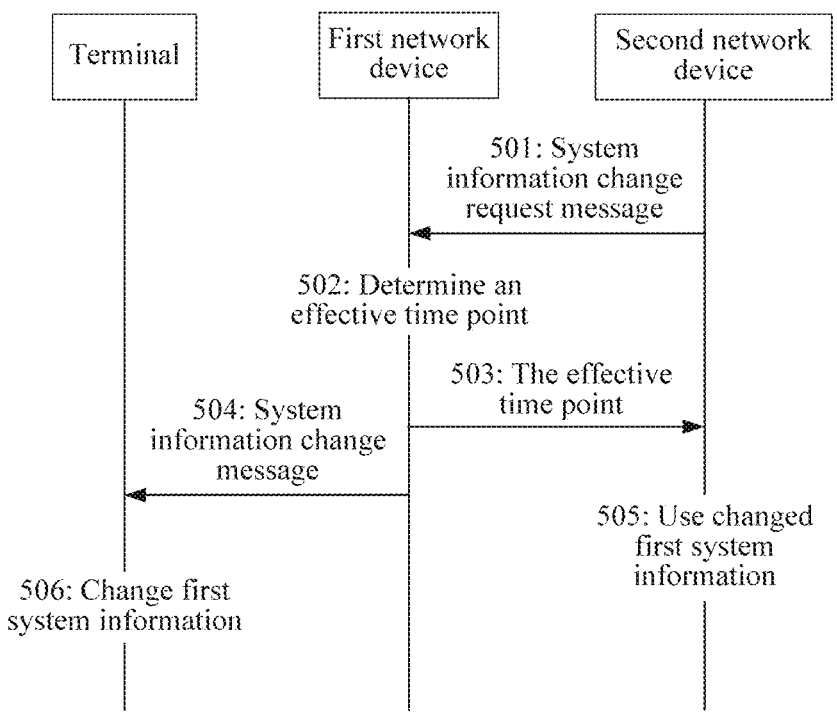
FIG. 5 is a schematic flowchart of a system information broadcasting method according to an embodiment of this application.

With reference to the foregoing descriptions, FIG. 5 is a schematic flowchart of a system information broadcasting method according to an embodiment of this application.

In FIG. 5, a terminal camps on a first cell and listens to a message broadcast in a second cell. The first cell and the second cell belong to different network devices. For a scenario in which the first cell and the second cell belong to a same network device, refer to the descriptions of FIG. 5, and details are not described herein again.

Step 501: A second network device sends a system information change request message to a first network device.

The system information change request message includes changed first system information.

Step 502: The first network device determines an effective time point of the changed first system information.

Step 503: The first network device returns the effective time point to the second network device.

Step 504: The first network device broadcasts a system information change message in the second cell, to inform a terminal receiving the system information change message that the first system information is changed.

A sequence of step 503 and step 504 is not limited in this embodiment of this application.

Step 505: The second network device uses the changed first system information at the effective time point.

Step 506: The terminal changes the first system information.

Based on a same technical concept, an embodiment of this application further provides a system information broadcasting apparatus. The apparatus can perform the foregoing method embodiments.

Figure 6:
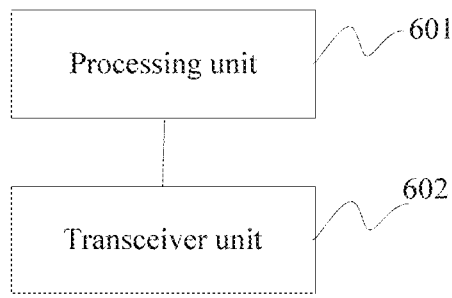
FIG. 6 is a schematic structural diagram of a system information broadcasting apparatus according to an embodiment of this application.

FIG. 6 is a schematic structural diagram of a system information broadcasting apparatus according to an embodiment of this application. The apparatus includes a processing unit 601, configured to determine first system information of a first cell. There is no broadcast channel in the first cell and no system information is broadcast. The apparatus includes a transceiver unit 602, configured to broadcast the first system information in a second cell of the first network device.

Optionally, the transceiver unit 602 is further configured to broadcast second system information of the second cell in the second cell.

Optionally, the first cell and the second cell belong to different network devices, and the network device to which the first cell belongs is a second network device. The transceiver unit 602 is further configured to: receive a system information change request message sent by the second network device. The system information change request message includes changed first system information. The transceiver unit is further configured to determine an effective time point of the changed first system information, and send the effective time point to the second network device to instruct the second network device to use the changed first system information at the effective time point.

Optionally, the transceiver unit 602 is further configured to: broadcast a system information change message in the second cell, to inform a terminal receiving the system information change message that the first system information is changed.

Optionally, the first cell and the second cell belong to different network devices, and the network device to which the first cell belongs is a second network device. The transceiver unit 602 is further configured to: receive a system information change request message sent by the second network device, where the change request message includes an effective time point; and broadcast a system information change message in the second cell based on the effective time point, to inform a terminal receiving the system information change message that the first system information is changed.

Optionally, the first system information or the second system information includes any one or more of the following information: a downlink timing offset between the first cell and the second cell; and a frequency list for broadcasting system information.

Optionally, a frequency used by the second cell is lower than a frequency used by the first cell, and the second cell performs broadcasting by using an omnidirectional antenna.

Based on a same technical concept, an embodiment of this application further provides a system information receiving apparatus. The apparatus can perform the foregoing method embodiments.

Figure 7:
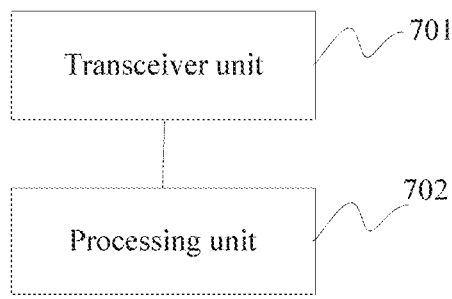
FIG. 7 is a schematic structural diagram of a system information broadcasting apparatus according to an embodiment of this application.

FIG. 7 is a schematic structural diagram of a system information receiving apparatus according to an embodiment of this application. The apparatus includes: a transceiver unit 701, configured to obtain first system information broadcast by a first network device in a second cell of the first network device, where the first system information is system information of a first cell, and there is no broadcast channel in the first cell and no system information is broadcast. The apparatus further includes a processing unit 702, configured to camp on or access the first cell based on the first system information.

Optionally, the transceiver unit 701 is further configured to: obtain a frequency list for broadcasting system information. The processing unit 702 is further configured to determine that a frequency of the second cell exists in the frequency list for broadcasting system information and that the second cell satisfies a camping condition; and camp on the second cell.

Optionally, the transceiver unit 701 is further configured to: listen to a system information change message broadcast by the first network device in the second cell; and change the first system information based on the system information change message if finding the system information change message through listening.

Optionally, the transceiver unit 701 is further configured to: listen to a paging message broadcast by the first network device in the second cell, where the paging message is used for paging the terminal; and access the first cell if finding the paging message through listening.

Optionally, the first system information includes a downlink timing offset between the first cell and the second cell; and the processing unit 702 is further configured to: determine a first system frame number SFN of the first cell based on a second SFN of the second cell and the downlink timing offset; or determine the first SFN based on a second SFN of the second cell if determining that the first cell and the second cell are downlink synchronous; or determine the first SFN based on a received random access message.

Optionally, the first system information includes any one or more of the following information: a downlink timing offset between the first cell and the second cell; and a frequency list for broadcasting system information.

Optionally, a frequency used by the second cell is lower than a frequency used by the first cell, and the second cell performs broadcasting by using an omnidirectional antenna.

Optionally, the first cell and the second cell belong to different network devices, and the network device to which the first cell belongs is a second network device.

Based on a same technical concept, an embodiment of this application further provides a system information receiving apparatus, for example, as described below with respect to FIG. 9. The apparatus can perform the foregoing method embodiments.

Based on a same technical concept, an embodiment of this application further provides a system information broadcasting apparatus, for example, as described below with respect to FIG. 8. The apparatus can perform the foregoing method embodiments.

Figure 8:
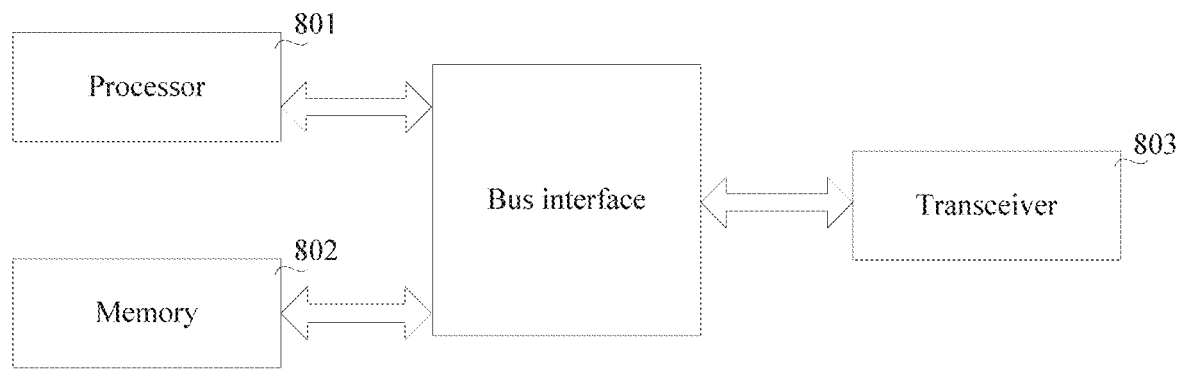
FIG. 8 is a schematic structural diagram of a system information broadcasting apparatus according to an embodiment of this application.

FIG. 8 is a schematic structural diagram of a system information broadcasting apparatus according to an embodiment of this application.

Referring to FIG. 8, the apparatus includes: a processor 801, a memory 802, and a transceiver 803.

The memory 802 is configured to store a program instruction and is coupled to the processor 801. The transceiver 803 is coupled to the processor 801 and is configured to support communication between the system information broadcasting apparatus and a terminal.

The processor 801 is configured to determine first system information of a first cell, where there is no broadcast channel in the first cell and no system information is broadcast.

The transceiver 803 is configured to broadcast the first system information in a second cell of the first network device.

For other content of the apparatus shown in FIG. 8, refer to the foregoing descriptions, and details are not described herein again.

Figure 9:
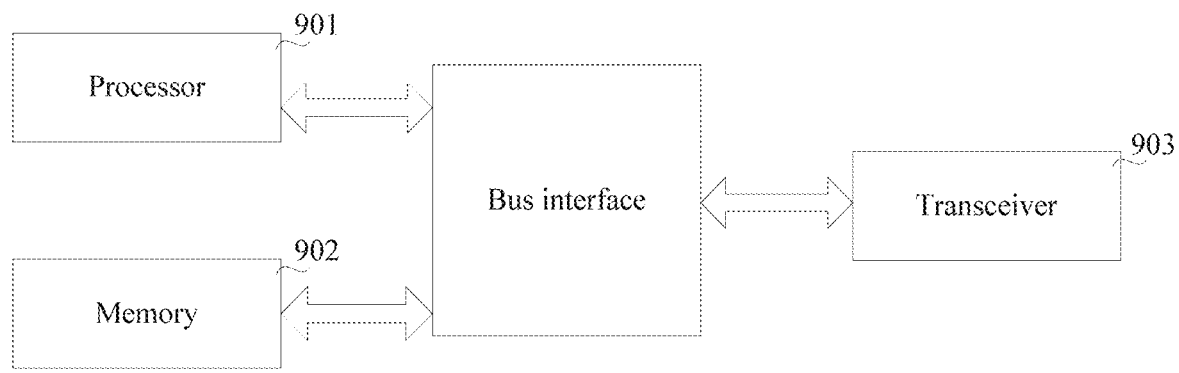
FIG. 9 is a schematic structural diagram of a system information broadcasting apparatus according to an embodiment of this application.

FIG. 9 is a schematic structural diagram of a system information receiving apparatus according to an embodiment of this application.

Referring to FIG. 9, the apparatus includes: a processor 901, a memory 902, and a transceiver 903.

The memory 902 is configured to store a program instruction and is coupled to the processor 901. The transceiver 903 is coupled to the processor 901 and is configured to support communication between the system information receiving apparatus and a first network device.

The transceiver 903 is configured to obtain first system information broadcast by the first network device in a second cell of the first network device, where the first system information is system information of a first cell, and there is no broadcast channel in the first cell and no system information is broadcast in the first cell.

The processor 901 is configured to camp on or access the first cell based on the first system information.

For other content of the apparatus shown in FIG. 9, refer to the foregoing descriptions, and details are not described herein again.

In FIG. 8 and FIG. 9, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random-access memory (RAM). The memory may further include a non-volatile memory, for example, a read-only memory (ROM), a flash memory, a hard disk drive (HDD), or a solid-state drive (SSD). The memory may further include a combination of the foregoing memories.

Optionally, FIG. 8 and FIG. 9 may further include a bus interface. The bus interface may include any quantity of interconnected buses and bridges. Specifically, the buses and the bridges link various circuits of one or more processors represented by the processor and a memory represented by the memory. The bus interface may further link various other circuits such as a peripheral device, a voltage stabilizer, and a power management circuit. These are known in the art. Therefore, no details are further described in this specification. The bus interface provides an interface. The transceiver provides a unit configured to communicate with various other devices by using a transmission medium. The processor is responsible for bus architecture management and general processing. The memory may store data used by the processor when the processor performs an operation.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations provided that they fall within the scope of protection defined by the following claims.

What is claimed is:

1. A method comprising:
   determining, by a first network device, first system information of a first cell, wherein there is no broadcast channel in the first cell and no system information is broadcast in the first cell;
   broadcasting, by the first network device, the first system information of the first cell in a second cell of the first network device;
   receiving, by the first network device, a system information change request message sent by a second network device, wherein the system information change request message comprises changed first system information; and
   determining, by the first network device, an effective time point of the changed first system information.

2. The method according to claim 1, wherein the method further comprises:
   broadcasting, by the first network device in the second cell, second system information of the second cell.

3. The method according to claim 2, wherein the first system information or the second system information comprises:
   a downlink timing offset between the first cell and the second cell; or
   a frequency list for broadcasting system information.

4. The method according to claim 1, wherein the method further comprises:
   sending the effective time point to the second network device, wherein sending the effective time point to the second network device instructs the second network device to use the changed first system information at the effective time point.

5. The method according to claim 4, wherein after sending the effective time point to the second network device, the method further comprises:
   broadcasting, by the first network device in the second cell, a system information change message, wherein the system information change message informs a terminal receiving the system information change message that the first system information is changed.

6. The method according to claim 1, wherein the method further comprises:
   broadcasting, by the first network device in the second cell, a system information change message according to the effective time point, wherein the system information change message informs a terminal receiving the system information change message that the first system information is changed.

7. The method according to claim 1, wherein a frequency used by the second cell is lower than a frequency used by the first cell, and wherein the second cell broadcasts using an omnidirectional antenna.

8. A method comprising:
   obtaining, by a terminal, first system information broadcast by a first network device in a second cell of the first network device, wherein first system information is system information of a first cell, and wherein there is no broadcast channel in the first cell and no system information is broadcast in the first cell;
   camping on or accessing, by the terminal, the first cell according to the first system information;
   monitoring for, by the terminal, a system information change message broadcast by the first network device in the second cell; and
   changing, by the terminal, the first system information according to the system information change message when the terminal receives the system information change message.

9. The method according to claim 8, wherein before obtaining, by the terminal, the first system information broadcast by the first network device in the second cell of the first network device, the method further comprises:
   obtaining, by the terminal, a frequency list for broadcasting system information;
   determining, by the terminal, that a frequency of the second cell exists in the frequency list for broadcasting system information and that the second cell satisfies a camping condition; and
   camping, by the terminal, on the second cell.

10. The method according to claim 8, wherein the first system information comprises a downlink timing offset between the first cell and the second cell, and wherein before accessing, by the terminal, the first cell according to the first system information, the method further comprises:
    determining, by the terminal, a first system frame number (SFN) of the first cell according to a second SFN of the second cell and the downlink timing offset;
    determining, by the terminal, the first SFN according to a second SFN of the second cell when the terminal determines that the first cell and the second cell are downlink synchronous; or
    determining, by the terminal, the first SFN according to receiving a random access message.

11. The method according to claim 8, wherein the first system information comprises:
    a downlink timing offset between the first cell and the second cell; or
    a frequency list for broadcasting system information.

12. The method according to claim 8, wherein a frequency used by the second cell is lower than a frequency used by the first cell, and wherein the second cell broadcasts using an omnidirectional antenna.

13. The method according to claim 8, wherein the first cell and the second cell belong to different network devices, and wherein the first cell belongs to a second network device.

14. An apparatus, comprising:
    a processor;

a non-transitory computer-readable storage medium storing a program to be executed by the processor, the program including instructions for:
　determining first system information of a first cell, wherein there is no broadcast channel in the first cell and no system information is broadcast in the first cell;
a transceiver configured to broadcast the first system information of the first cell in a second cell of the apparatus;
wherein the transceiver is further configured to receive a system information change request message sent by a second apparatus, wherein the system information change request message comprises changed first system information; and
wherein the instructions comprise further instructions for determining an effective time point of the changed first system information.

15. The apparatus according to claim 14, wherein the first cell and the second cell physically overlap.

16. The apparatus according to claim 14, wherein the transceiver is further configured to broadcast, in the second cell, second system information of the second cell.

17. The apparatus according to claim 16, wherein the first system information or the second system information comprises:
　a downlink timing offset between the first cell and the second cell; or
　a frequency list for broadcasting system information.

18. The apparatus according to claim 14, wherein the first cell and the second cell belong to different apparatuses, wherein the first cell belongs to the second apparatus, and wherein the transceiver is further configured to:
　send the effective time point to the second apparatus, wherein sending the effective time point to the second apparatus instructs the second apparatus to use the changed first system information at the effective time point.

19. The apparatus according to claim 18, wherein the transceiver is further configured to: after sending the effective time point to the second apparatus, broadcast, in the second cell, a system information change message, wherein the system information change message informs a terminal receiving the system information change message that the first system information is changed.

* * * * *